Figure 1:
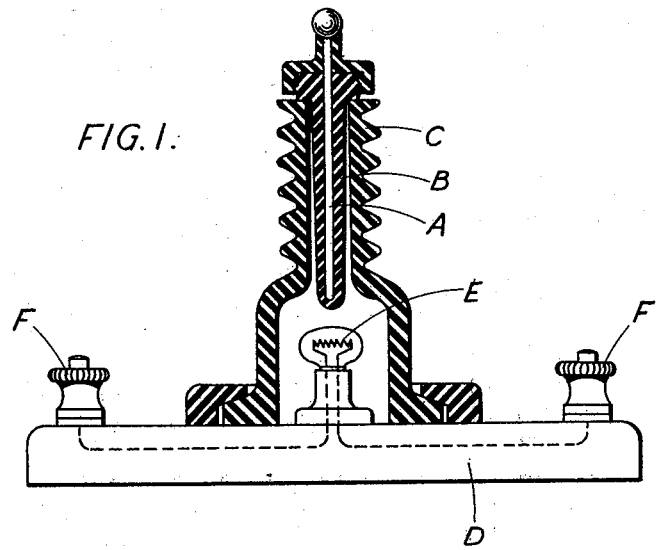

Patented Jan. 6, 1931

1,787,879

UNITED STATES PATENT OFFICE

WILLIAM MUNDELL THORNTON, OF NEWCASTLE-UPON-TYNE, ENGLAND

ELECTRICAL INSTRUMENT FOR MEASURING, INDICATING, AND OTHER PURPOSES

Application filed April 13, 1928, Serial No. 269,858, and in Great Britain May 5, 1927.

This invention relates to electrical instruments for measuring, indicating and other purposes, and is based upon the discovery by the present applicant that, if a heated conductor is placed in an alternating electrostatic field, the conductor is cooled and that the amount of such cooling is a measure of the intensity of the field. This effect is probably due to the movement of electrically-charged molecules of air at the surface of the heated conductor, and such movement may be referred to as an "ionic wind." This cooling effect also takes place when the electrostatic field is unidirectional although in that case such effect is most apparent at extra high voltages.

In its broad aspect the invention comprises an electrical instrument having a conductor heated preferably electrically and operating by reason of the cooling effect upon the heated conductor of an electrostatic field either unidirectional or alternating in which it is placed.

The cooling effect produces a change in the resistance of the heated conductor and such change is indicated or measured by any suitable arrangement, such as a Wheatstone bridge or potentiometer. Preferably the heated conductor is of a material which has a high rate of change of resistance with temperature and it is shielded from air currents as, for instance, by enclosing it in a glass vessel which may be filled with air or gas at any desired pressure.

The heated conductor may itself form one electrode of the electrostatic field, or it may be interposed in such a field between independent electrodes. In either case the heated conductor is preferably practically at earth potential and the electrode at high potential insulated in solid or other di-electric which forms an enclosure or sheath for it and renders the portion adjacent to the heater and other low potential parts inaccessible.

The applications of an instrument according to this invention are numerous and the following are given by way of examples.

When the instrument is to be used as a volt meter the heated conductor may constitute one arm of a Wheatstone bridge with a battery and galvanometer joined across opposite points in the usual fashion. Adjacent to the heater is an electrode preferably insulated as described and connected when the voltage is alternating to one end of a transformer winding and the other end of such winding is earthed and connected to the junction of the heated conductor with the adjacent arm of the bridge. The galvanometer may be calibrated to read directly in voltages.

If the electric characteristics of the heated conductor are known the instrument may be used to measure watts by, for instance, first using it as a volt meter as above mentioned and then by inserting the heated conductor so that it forms directly or indirectly part of the circuit in which the power is to be measured, the current may be measured by the change of resistance in the conductor, the electrostatic field being cut off. The product will then give the watts.

On alternating current circuits it is found that below a certain frequency the cooling effect of the "ionic wind" depends on the frequency of the alternating electrostatic field and thus by keeping the voltage constant the instrument may be used to measure frequency. It follows that in any instance if the resistance of the circuit is known or can be measured, then, having determined the frequency, the inductance or capacity in the circuit can be found.

As previously mentioned, the heated conductor may be enclosed in, for instance, a glass vessel and it is found that the cooling effect of the electrostatic field varies at any rate over a considerable range with the pressure in such vessel. The instrument may therefore be used to measure gaseous pressures.

The improved instrument is particularly adapted for use in all measurements involving high or extra high voltages for, as previously mentioned, no part at high potential need be handled or accessible during the use of the instrument. Moreover the galvanometer or other instrument and the Wheatstone bridge or like arrangement to which it is connected may be at a considerable distance from the instrument itself.

Figure 2:
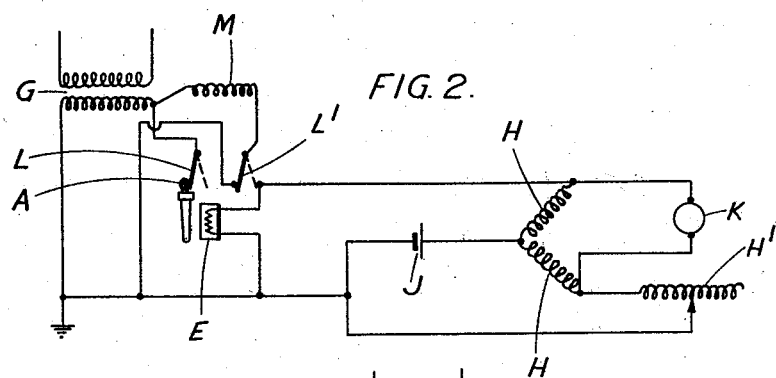
Figure 3:
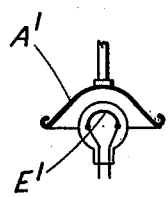
Figure 4:
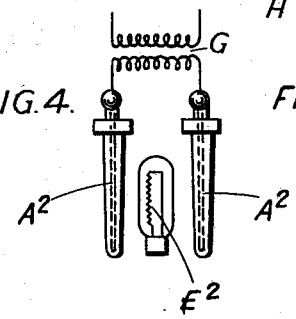
Figure 5:
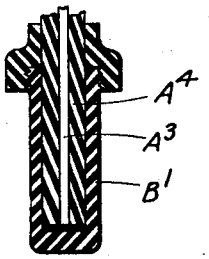

In the accompanying drawings,

Figure 1 is an elevation with a portion in section showing the essential parts of one practical form of an electrical instrument according to this invention, Figure 2 is a diagram showing the instrument in a circuit suitable for making various electrical measurements, and Figures 3, 4 and 5 show diagrammatically alternative ways in which the parts of the instrument may be arranged.

With reference first to Figure 1 the high tension electrode is in the form of a conducting rod A contained in an insulating sheath B which covers it except for a knob or terminal at the upper end to which connection may be made. This sheathed electrode is supported on a hollow insulator C which is practice may be of considerably greater relative length than is shown in the figure. This hollow insulator C is mounted upon a base D and its lower portion forms a chamber containing a conductor E adapted to be heated. This conductor is shown as a small filament sealed within a bulb and having its ends connected to terminals F on the base.

The circuit diagram forming Figure 2 indicates how the instrument may be used for making electrical measurements, for example a measurement of alternating current voltage.

The high tension electrode A is joined through a switch L to one end of the secondary winding of a transformer G supplying current to a load represented at M connected to earth by a switch $L^1$ in the position shown in full lines. The conductor E forms one arm of a Wheatstone bridge of which the resistances H and the variable resistance $H^1$ constitute the other arms. A battery J and a galvanometer K are joined in the circuit as shown, and the conductor E is earthed.

Supposing the arrangement to be such that when no voltage is applied to the electrode A the conductor E is heated say to a dull red and the galvanometer reads zero, then when voltage is applied to A the conductor E is cooled and the amount of such cooling will be indicated by a reading on the galvanometer which may be calibrated to read voltages. Obviously the same result may be obtained by calibrating the variable resistance and adjusting that to bring the galvanometer reading back to zero.

If the switches L and $L^1$ be moved into the position shown in dotted lines the electrode A is disconnected and the heated conductor E thrown into the load circuit. The load current may then be measured on the bridge and the product of that reading with the voltage read when the high tension circuit is connected to the electrode A will give the volt-amperes or kilovolt-amperes of the circuit.

When the voltage is unidirectional or the load known to be non-inductive the instrument can be used in this way as a watt meter.

The construction of the various parts may vary in many ways. For example, the electrode A need not always be sheathed with an insulator. It may also vary in form, as for example in Figure 3 where it is shown as a dished unsheathed member $A^1$ acting in conjunction with a filament $E^1$.

Again, the heated conductor does not necessarily form one electrode of the electrostatic field as it does in Figure 2, but may be placed between the two electrodes of that field as is shown for example in Figure 4 where the heated conductor $E^2$ has on each side of it an electrode $A^2$ connected to the transformer secondary.

A somewhat similar arrangement, i. e. one with the heated conductor between two electrodes, but with the electrodes of the same polarity and connected to separate sources of high voltage, may be used for comparing such voltages, as for instance in connection with synchronizing operations.

In some cases the end of a high tension cable may itself form the electrode as in Figure 5 where $A^3$ is the conductor of such a cable and $A^4$ its insulation. The end of the cable is sealed into an insulating container $B^1$ corresponding to the sheath B of Figure 1 and adapted, for instance, to be supported in an insulator such as the insulator C of Figure 1.

The dimensions of the heated conductor may be quite small; in many instances its length may be a few millimetres and the size and shape of its enclosing bulb or chamber may vary to suit requirements. When the air or gas within the bulb is at other than atmospheric pressure that pressure may be varied to suit the voltage which is to be applied to the instrument. The volume of the enclosed space within the bulb or other containing chamber should be sufficient to give the desired cooling effect due to the movement of ionized gas but small enough to minimize the effect of convection currents on the temperature of the heated conductor.

Although it is preferred to enclose the heated conductor in a bulb that is not essential when, as in Figure 1, that conductor is in a chamber or small enclosed space. Obviously the chamber at the bottom of the insulator C in Figure 1 might be made so as to exclude outside influences on the heated conductor, and if desired could be sealed or otherwise made gas-tight.

What I claim as my invention and desire to secure by Letters Patent is:—

1. An electrical instrument having a heated conductor in an electrostatic field and operating through the cooling effect of that field upon the heated conductor.

2. In an electrical instrument, the combination of means for producing an electrostatic field, a conductor in said field, and means for measuring the cooling effect of said field upon said conductor.

3. In an electrical instrument, the combination of means for producing an electrostatic field, a conductor in said field, means for heating said conductor electrically, and means for measuring the change of resistance of the heated conductor due to the cooling effect of said electrostatic field.

4. In an electrical instrument, the combination of means for producing an electrostatic field, a conductor in said field, means for heating said conductor electrically, and means for measuring the change of resistance of the heated conductor due to the cooling effect of said electrostatic field in terms of the voltage producing said field.

5. In an electrical instrument for measuring high voltages, the combination of an insulating support, an electrode in said support adapted to be joined to one pole of a source of high voltage, a conductor in proximity to said electrode, means for heating said conductor by passing a current through it, and means for measuring the change of resistance in said heated conductor due to the cooling effect of the electrostatic field produced by the application of the voltage to said electrode.

6. In an electrical instrument for measuring high voltages, the combination of an insulating support, an electrode in said support adapted to be joined to one pole of a source of high voltage, a conductor in proximity to said electrode, means for heating said conductor by passing a current through it, said conductor being connected to the other (earthed) pole of the source of high voltage, and means for measuring the change of resistance in said heated conductor due to the cooling effect of the electrostatic field produced by the application of the voltage to said electrode.

7. In an electrical instrument for measuring high voltages, the combination of an insulating support, an electrode enclosed in solid di-electric material and held in said support, a source of high voltage having one pole connected to said electrode, a conductor in proximity to said electrode, a bulb enclosing said conductor, means for heating said conductor by passing a current through it, said conductor being connected to the other (earthed) pole of the source of high voltage, and means for measuring the cooling effect on the conductor of the electrostatic field produced by the high voltage.

In testimony whereof I have signed my name to this specification.

WILLIAM MUNDELL THORNTON.